Patented July 1, 1941

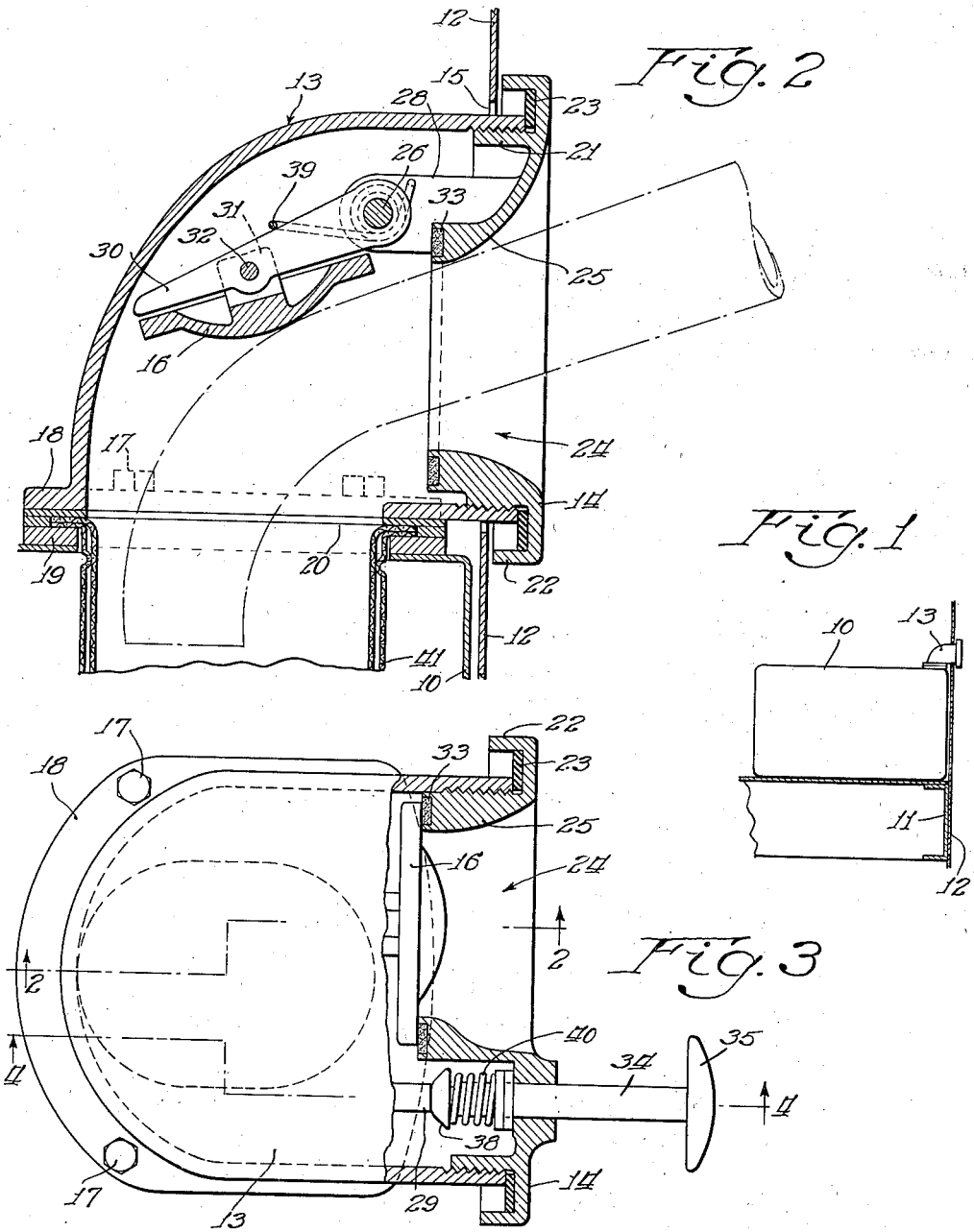

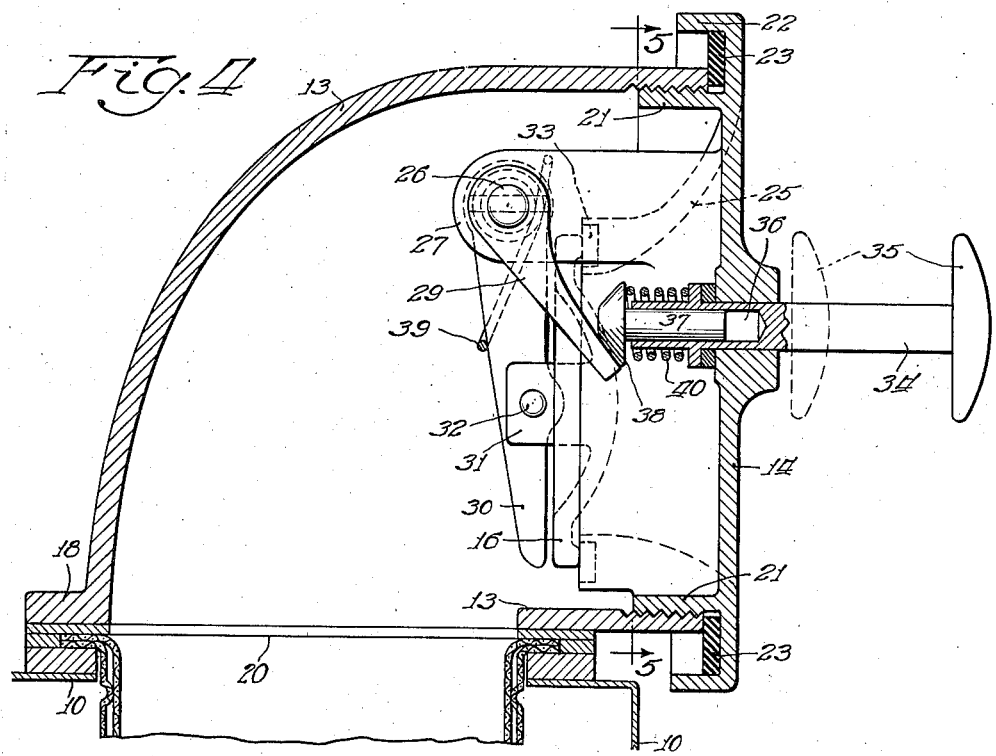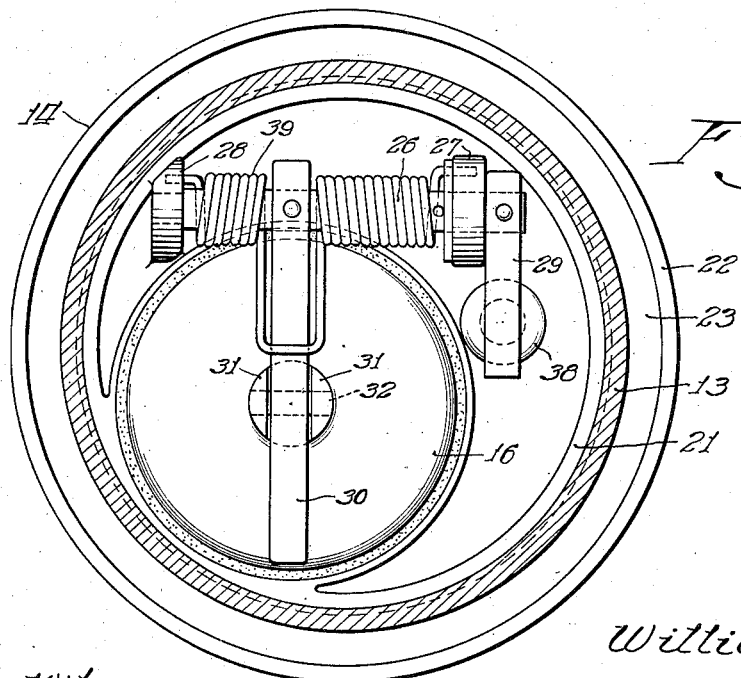

2,247,509

UNITED STATES PATENT OFFICE 2,247,509

FILLER ATTACHMENT FOR GASOLINE TANKS

William A. Lebus, Chicago, Ill., assignor to Protectoseal Company of America, Inc., Chicago, Ill., a corporation of Illinois Application November 4, 1938, Serial No. 238,730

2 Claims. (Cl. 220—86)

The invention relates to fittings for gasoline tanks carried by vehicles, and more particularly it relates to fittings providing a filler opening and a cover member normally closing the opening.

Gasoline tanks of the kind described are in general elongated transversely of the vehicles on which they are mounted and have cap fittings providing filler openings positioned at or near the end of the tank where they are easily accessible from the side of the vehicle for insertion of a nozzle for filling the tank. The accessibility of the cap fittings expose them to danger of theft or injurious tampering or removal by unauthorized persons, and if the covers or closure members are detachably mounted on the fitting, for example, by a threaded connection, as is frequently the case, they are liable to be inadvertently misplaced by an attendant or to become loose by the vibration of the vehicle with the result that the contents of the tank are wasted and increase the hazard of fire.

To eliminate possibility of loss of the covers or closure elements, it is common practice to fasten the same to the outside of the fitting by means of a pivot and provide a spring tending to maintain the cover seated on and closing the opening. The length and capacity of gasoline tanks for large vehicles such as passenger busses and the like are in general such that centrifugal force resulting from rounding curves at high speed frequently forces the liquid against the cover or closure member, causing it to open against the resistance of the spring, or in the alternative, a relatively stiff spring is required to resist the liquid pressure. Tests have demonstrated that caps mounted on tanks of the capacity commonly used on passenger busses are frequently subjected to a maximum pressure of four pounds per square inch. Obviously, a spring sufficiently rigid to oppose this pressure and maintain the cover closed renders it difficult to manipulate the cover to permit insertion of a filler nozzle in the cap. On the other hand, it is found that by placing the valve or closure element inside of the fitting in such a manner that the internal fluid pressure tends to close the valve, a relatively small spring is adapted to maintain the valve closed under all conditions of operation and easily yields to permit opening of the valve for insertion of a nozzle.

The invention has as one of its objects the provision of an improved cap member for the filler opening of tanks, the cap member providing an aperture for insertion of a filler nozzle, and an interiorly positioned valve member operable to close the aperture, and spring pressed mounting means adapted to maintain the valve member normally seated upon and sealing the inner end of the aperture, the mounting of the valve member being such that fluid pressure within the cap member tends to maintain the valve member in closed position.

Another object of the invention is the provision of an improved tank fitting and closure element of the kind described which is durable, simple, inexpensive to manufacture, efficient and satisfactory for its intended purpose.

Many other objects and advantages of the construction herein shown and described will be obvious to those skilled in the art from the disclosure herein given.

To this end, my invention consists in the novel construction, arrangement, and combination of parts herein shown and described and more particularly pointed out in the claims.

In the drawings wherein like reference characters indicate like or corresponding parts:

Fig. 1 is a diagrammatic view of a gasoline tank equipped with a fitting embodying the principles of the invention;

Fig. 2 is an approximately full-size vertical sectional view through a fitting comprising a hollow cap or filler member, a head member, and a valve or closure element, the section being taken approximately along the line 2—2 of Fig. 3 and the valve being shown in open position;

Fig. 3 is a plan view of the fitting, the valve being shown in closed position and the head member being shown partially in section;

Fig. 4 is a sectional view along the line 4—4 of Fig. 3; and

Fig. 5 is a view, along the line 5—5 of Fig. 4, illustrating the head member and valve as they appear when in closed vertical position.

Referring now more particularly to the drawings, the numeral 10 generally designates a gasoline tank connected with a support 11 and having its outer end terminating at one side of a vehicle. The tank 10 may be of any suitable dimensions and is preferably enclosed or protected by an apron plate 12 forming a side wall of the vehicle.

A tank fitting, comprising a hollow cap or filler member 13 and a head member 14, is mounted on the top of the tank 10. The cap member 13 is preferably L-shaped with its inner end opening into the tank and its outer end extending through an aperture 15 provided by the apron plate 12, and closed by the head member 14 and a valve or closure element 16.

The inner end of the cap or filler member 13 opens into and is rigidly connected with the tank 10 preferably by bolts 17, extending through a flange 18 provided by the member and a ring 19 welded or otherwise rigidly connected to the tank and forming an annular boundary for the filler opening of the tank. A screen 41 is connected with the ring 19 by any suitable means such as welding or the like. Gaskets of any suitable material form a fluid-tight seal between the cap member 13 and the ring 19.

The head member 14 is detachably connected with the cap member 13 preferably by an exteriorly threaded ring 21 integrally formed with the head member. The outer periphery of the head member 14 is bounded by an inwardly projecting flange 22 overlapping and slightly spaced from the apron plate 12 to avoid frictional contact therewith. A gasket ring 23 provides a fluid-tight seal and cushion between the outer periphery of the head member 14 and the threaded end of the cap member 13. The mounting of the head member 14 is such that it is not easily removed by unauthorized persons and does not become loose by the vibration of the vehicle on which it is mounted and is a substantially permanent closure for the fitting.

The head member 14, more or less premanently connected with the cap member 13 as described, provides an opening or port 24 for insertion of a filling nozzle in the cap member as shown in dotted lines in Fig. 2. The port 24 is bounded by an inwardly projecting eccentrically positioned annular flange member 25 on which is mounted a gasket 33 providing a seat for the valve disc 16.

The disc 16 is rotatable from its closed position of Figs. 3, 4, and 5 to its open position of Fig. 2 and vice versa by oscillation of a shaft 26. The shaft is journalled in standards 27 and 28, preferably integrally formed with the head member 14, and is actuated by arms 29 and 30 rigidly connected therewith. The disc 16 has two spaced apart integral stems 31 extending along the opposite sides of and loosely fitting the arm 30. The stems 31 are connected with the arm by a pivot 32, the connection being such that the spring pressed disc 16 is self adjusting to inequalities in the surface of the gasket 33 carried by the flange member 25, and seals the port 24 against leakage.

The shaft 26 is manually actuated to rotate the disc 16 and to open the port 24 by means of a plunger rod 34 longitudinally movable in a seat provided by the head member 14. The outer end of the rod 34 carries a knob 35, and its inner end is provided with a bore 36 in which a stem 37 is slidably mounted. The outer end of the stem 37 has a head 38 held in operative engagement with the arm 29 by a spring 40. A spring 39 mounted on the shaft 26 and positioned in spring pressed engagement with the arm 30 yieldingly holds the shaft and the arms 29 and 30 in the closed position of the valve disc 16.

The spring 39 is preferably so constructed that it yields under relatively slight pressure exerted on the knob 35 to permit rotation of the shaft and thereby to move the disc 16 to its open position, as shown in Fig. 2. The plunger rod 34 is mounted adjacent to the port 30 and is preferably so positioned that an attendant may with one hand actuate the rod to open the port 24 and simultaneously insert a filling nozzle through the open port. It is desirable that the outer peripheral edge of the disc 16 remain smooth and unmarred in order that it may closely fit the valve seat gasket 33. In inserting and removing the filler nozzle from the port 24, it will frequently contact with the disc 16, and in order to prevent possiblity of the outer portion of the disc being worn by contact with the nozzle, the central portion of the disc is made substantially convex outwardly as shown.

The described mounting of the disc 16 in the cap member 13 and on the inner side of the head member 14, with the disc spring pressed outwardly to close the port 24, utilizes all fluid pressure within the cap, whether caused by centrifugal force or otherwise to cooperate with the spring 39 to maintain the disc 16 pressed against the gasket 33, and thereby to prevent any possibility of leakage. By reason of the fluid pressure cooperating with the spring 39 to maintain the disc 16 closed, a low pressure spring 39 can be used with the resulting advantages of easy manipulation of the disc 16 to open position and a minimum of abrasion of the filler nozzle in contact with the valve disc 16. The disc 16 may also be operated independently of the plunger rod 34 merely by pressing the end of the filler nozzle against the disc 16 to overcome the resistance of the spring 39.

Thus, it will be seen that I have provided an improved tank fitting of the kind described comprising a cap or filler member having an interior valve, and spring actuated means adapted to maintain the valve in closed position, said valve being inaccessible to unauthorized persons and operable in such a manner that internal fluid pressure cooperates with the spring to maintain the valve in closed position.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. A tank fitting of the kind described comprising a hollow cap member having one end closed, said member providing a port for insertion of a filler nozzle, a shaft oscillatable in said member, a valve disc operable by oscillation of the shaft to open and close said port, spring means yieldably maintaining the shaft in the closed position of the disc, an arm projecting laterally from said shaft, and a plunger rod projecting from the member having its inner end engaging said arm and operable to rotate the shaft from closed to open position of the disc.

2. A tank fitting of the kind described comprising a hollow cap or filler member having one end adapted for connection with the top of and opening into the tank and its other end closed and providing a port for insertion of the filler nozzle, a shaft mounted in said member adjacent to the port, an arm projecting laterally from the shaft, a valve disc pivotally mounted on said arm and operable by oscillation of the shaft to open and close the port, spring means normally maintaining the shaft in the closed position of the disc, a second arm projecting laterally from the shaft, and a plunger rod projecting from the member adjacent said port with its inner end engaging said second arm, said rod being manually operable to rotate the shaft against the resistance of said spring means to move said disc to open said port.

WILLIAM A. LEBUS.